Oct. 9, 1956
W R. FISHER
BEARING
Filed July 29, 1953
2,766,084
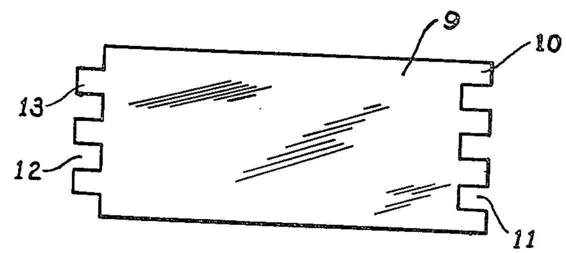
Fig. 2.
Fig. 5
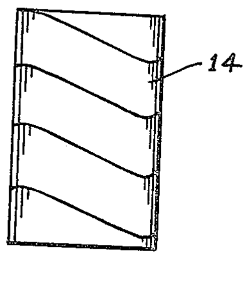
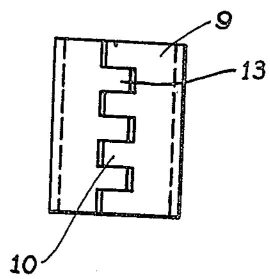
Fig. 3.
Fig. 6
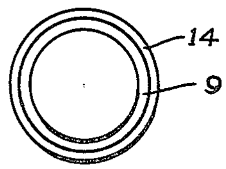
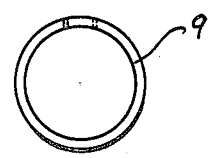
Fig. 4
INVENTOR.
W. Rewon Fisher
BY

United States Patent Office 2,766,084

Patented Oct. 9, 1956

2,766,084

BEARING

W Reuen Fisher, North Branch, Mich.

Application July 29, 1953, Serial No. 371,090

5 Claims. (Cl. 308—237)

My invention relates to a new and useful improvement in a bearing to serve as a journal for rotating parts.

It is an object of the present invention to provide a bearing which will be simple in structure, economical to manufacture, durable, compact and highly efficient in use.

Another object of the invention is the provision of a bearing having a liner portion which engages the rotating part and which may be easily and quickly removed and replaced.

Another object of the invention is the provision of a bearing having a liner which is flexible to the extent that it may expand and contract radially.

Other objects will appear hereinafter.

It is recognized that various modifications and changes may be made in the details of structure illustrated without departing from the invention and it is intended that the present disclosure be considered to be but the preferred embodiment.

Forming a part of this application are drawings in which,

Fig. 1 is a plan view of the blank from which the liner is made.

Fig. 2 is an elevational view of the blank shown in Fig. 1.

Fig. 3 is an elevational view with the blank shown in Fig. 1 formed into cylindrical formation.

Fig. 4 is an end elevational view of the structure shown in Fig. 3.

Fig. 5 is an elevational view of the outer layer of the bearing.

Fig. 6 is an end elevational view of the completed invention.

The bearing comprises an outer sleeve or cylinder 14 which is formed from a spirally wound strip of hardened wear-resisting metal. An inner liner is provided in the cylinder 14, which is formed before mounting in said cylinder from a sheet of suitable material so as to have a shape as illustrated by the sheet 9. This liner may be of metal of a different kind from the hardened wear resisting metal, such as bronze or the like, or it may be formed of some wear resisting plastic which is suitable for bearing purposes. When formed from plastic it, of course, would have to be heated to a degree where it could be formed into the cylindrical form shown in Fig. 9, but if formed with metal no heating would be necessary.

At one end of the sheet 9 are tongues 10 spaced apart by the spaces 11. At the opposite end of the sheet 9 are tongues 13 spaced apart by the spaces 12, the arrangement being such that when the structure is formed into cylindrical form, the tongue 13 will engage in the space 11 and the tongue 10 will engage in the space 12. As shown in Fig. 3, normally these tongues 13 and 10 do not reach to the bottom of the spaces 11 and 12 so that the cylindrical formation 9 may be reduced to smaller diameter by squeezing radially inwardly. When in such form the member 9 in its cylindrical formation may be inserted into the cylindrical tube body 14 which forms the outer shell. Upon being seated in the outer casing or shell, the inner tubing member will expand until it snugly engages at its periphery with the inner surface of the outer casing.

Due to the spiral formation of the outer casing, this outer casing may, in use, elongate or contract to a certain degree and in this elongation or construction the diameter of the outer casing will be affected. Due to the split structure of the inner tube formation, the liner or inner tube may accommodate itself as to diameter to correspond to the variations in diameter of the outer casing. Experience has shown that in some operations this characteristic is quite desirable. When the liner 9 becomes worn, as is obvious, this liner may be removed and replaced without disturbing the mounting of the inner casing in a supporting body.

What I claim is:

1. A bearing of the class described, comprising: an outer tubular shell comprising a spirally wound continuous strip of wear-resisting metal; a longitudinally split tubular liner for said outer shell expandable and contractible as to its diameter in conformance with the expansion or contraction of the diameter of the outer shell, and of a material less wear-resisting than the outer shell.

2. A bearing of the class described, comprising: a tubular outer shell of a spirally wound continuous strip of wear-resisting metal; a tubular liner for said outer shell, split longitudinally and engageable in snug relation with the outer shell, the opposed edges of the liner at the line of said split being provided with alternate tongues and spaces freely interlacing with each other.

3. A bearing of the class described, comprising: a tubular outer shell of a spirally wound continuous strip of wear-resisting metal; a tubular liner for said outer shell, split longitudinally and engageable in snug relation with the outer shell, the opposed edges of the liner at the line of said split being provided with alternate tongues and spaces freely interlacing with each other, said tongues, when said liner is in normal position, being spaced apart at their ends from the bottom of the spaces into which they are projected to permit free inward movement of the tongues into the spaces.

4. A bearing of the class described, comprising: a tubular body formed from a continuous strip of spirally wound resilient wear-resisting metal; a tubular liner for said tubular body positioned therein and in engagement at its periphery with the inner surface of said tubular body, said liner comprising a single piece of material folded upon itself; spaced apart tongues projecting from one opposed edge toward the other in staggered relation, the tongues of one edge freely engaging between the tongues of the other edge and said opposed edges being movable toward each other to accommodate the diameter of said liner with the diameter of said body.

5. A bearing of the class described, comprising: a tubular body formed from a continuous strip of spirally wound wear-resisting metal; a tubular plastic liner for said body normally engaging at its periphery in snug engagement with the inner surface of said body and formed from a single blank with the end edges opposing each other; and spaced apart tongues projecting outwardly from each of said end edges toward the opposed end edge, said tongues being in staggered relation and freely engaging between a pair of tongues on the opposed edge, the ends of said tongues being normally spaced from the bottom of the space between the tongues in which engaged.

References Cited in the file of this patent

UNITED STATES PATENTS

| | | |
|---|---|---|
| 1,130,336 | Renkenberger | Mar. 2, 1915 |
| 1,745,425 | Johnson | Feb. 4, 1930 |
| 1,746,981 | Anderson | Feb. 11, 1930 |
| 2,666,677 | Miller | Jan. 19, 1954 |

FOREIGN PATENTS

| | | |
|---|---|---|
| 677,873 | Great Britain | Aug. 20, 1952 |

OTHER REFERENCES

Motor Magazine, page 90, October 1951.